(12) United States Patent
Shimozaki

(10) Patent No.: US 11,557,114 B2
(45) Date of Patent: *Jan. 17, 2023

(54) SYSTEMS AND METHODS FOR ANALYSIS OF IMAGES OF APPAREL IN A CLOTHING SUBSCRIPTION PLATFORM

(71) Applicant: CaaStle, Inc., New York, NY (US)

(72) Inventor: Steven Sesshu Shimozaki, Rocklin, CA (US)

(73) Assignee: CaaStle, Inc., New York, NY (US)

( * ) Notice: Subject to any disclaimer, the term of this patent is extended or adjusted under 35 U.S.C. 154(b) by 126 days.

This patent is subject to a terminal disclaimer.

(21) Appl. No.: 17/124,686

(22) Filed: Dec. 17, 2020

(65) Prior Publication Data

US 2021/0103729 A1  Apr. 8, 2021

Related U.S. Application Data

(63) Continuation of application No. 16/920,064, filed on Jul. 2, 2020, now Pat. No. 10,902,261, which is a (Continued)

(51) Int. Cl.
*G06T 7/90* (2017.01)
*G06V 20/10* (2022.01)
(Continued)

(52) U.S. Cl.
CPC .............. *G06V 20/10* (2022.01); *G06F 16/51* (2019.01); *G06F 16/583* (2019.01);
(Continued)

(58) Field of Classification Search
CPC ............ G06K 9/00664; G06K 9/6267; G06K 9/00288; G06T 7/194; G06T 7/60;
(Continued)

(56) References Cited

U.S. PATENT DOCUMENTS 5,930,769 A   7/1999 Rose
8,976,230 B1  3/2015 Vendrow
(Continued)

OTHER PUBLICATIONS

Ziwei Liu et al., "DeepFashion: Powering Robust Clothes Recognition and Retrieval with Rich Annotations", Jun. 2016, Web. (5 pages) http://mmlab.ie.cuhk.edu.hk/projects/DeepFashion.html.
(Continued)

*Primary Examiner* — Phuoc Tran
(74) *Attorney, Agent, or Firm* — Bookoff McAndrews, PLLC

(57) ABSTRACT

Disclosed are methods, systems, and non-transitory computer-readable medium for color and pattern analysis of images including wearable items. For example, a method may include receiving an image depicting a wearable item, identifying the wearable item within the image by identifying a face of an individual wearing the wearable item or segmenting a foreground silhouette of the wearable item from background image portions of the image, determining a portion of the wearable item identified within the image as being a patch portion representative of the wearable item depicted within the image, deriving one or more patterns of the wearable item based on image analysis of the determined patch portion of the image, deriving one or more colors of the wearable item based on image analysis of the determined patch portion of the image, and transmitting information regarding the derived one or more colors and information regarding the derived one or more patterns.

20 Claims, 10 Drawing Sheets

Related U.S. Application Data continuation of application No. 16/594,532, filed on Oct. 7, 2019, now Pat. No. 10,726,265, which is a continuation of application No. 16/514,294, filed on Jul. 17, 2019, now Pat. No. 10,528,814, which is a continuation of application No. 16/417,862, filed on May 21, 2019, now Pat. No. 10,402,648.

(51) Int. Cl.
| | |
|---|---|
| *G06F 16/51* | (2019.01) |
| *G06F 16/583* | (2019.01) |
| *G06T 7/70* | (2017.01) |
| *G06T 7/60* | (2017.01) |
| *G06K 9/62* | (2022.01) |
| *G06T 7/194* | (2017.01) |
| *G06V 40/16* | (2022.01) |

(52) U.S. Cl.
CPC ............ *G06K 9/6267* (2013.01); *G06T 7/194* (2017.01); *G06T 7/60* (2013.01); *G06T 7/70* (2017.01); *G06T 7/90* (2017.01); *G06V 40/172* (2022.01); *G06T 2207/20056* (2013.01)

(58) Field of Classification Search
CPC ... G06T 7/70; G06T 7/90; G06T 2207/20056; G06F 16/583; G06F 16/51
See application file for complete search history.

(56) References Cited

U.S. PATENT DOCUMENTS

| | | | |
|---|---|---|---|
| 9,639,880 | B2 | 5/2017 | Dalal et al. |
| 10,109,051 | B1 | 10/2018 | Natesh et al. |
| 10,726,265 | B1 | 7/2020 | Shimozaki |
| 10,902,261 | B2 * | 1/2021 | Shimozaki ................ G06T 7/60 |
| 2008/0126190 | A1 | 5/2008 | Gosnell et al. |
| 2010/0111370 | A1 | 5/2010 | Black et al. |
| 2014/0279289 | A1 | 9/2014 | Steermann |
| 2017/0004567 | A1 | 1/2017 | Dutt et al. |
| 2017/0287044 | A1 | 10/2017 | Rose et al. |
| 2018/0240280 | A1 | 8/2018 | Chen et al. |

OTHER PUBLICATIONS

S. M. Sofiqul Islam et al., "A CNN Based Approach for Garments Texture Design Classification", Feb. 8, 2017, p. 119-125, vol. 2, No. 4, Advances in technology Innovation. (7 pages).

Menglin Jia et al., "A Deep-Learning-Based Fashion Attributes Detection Model", p. 1-7, Cornell University. (7 pages).

Kota Yamaguchi, "PaperDoll Parsing", Oct. 28, 2016, Web. (5 pages) http://vision.is.tohoku.ac.jp/~kvamagu/research/paperdoll/.

International Preliminary Report on Patentability and Written Opinion issued in International Application No. PCT/US20/33349, dated Jul. 31, 2020 (8 pages).

\* cited by examiner

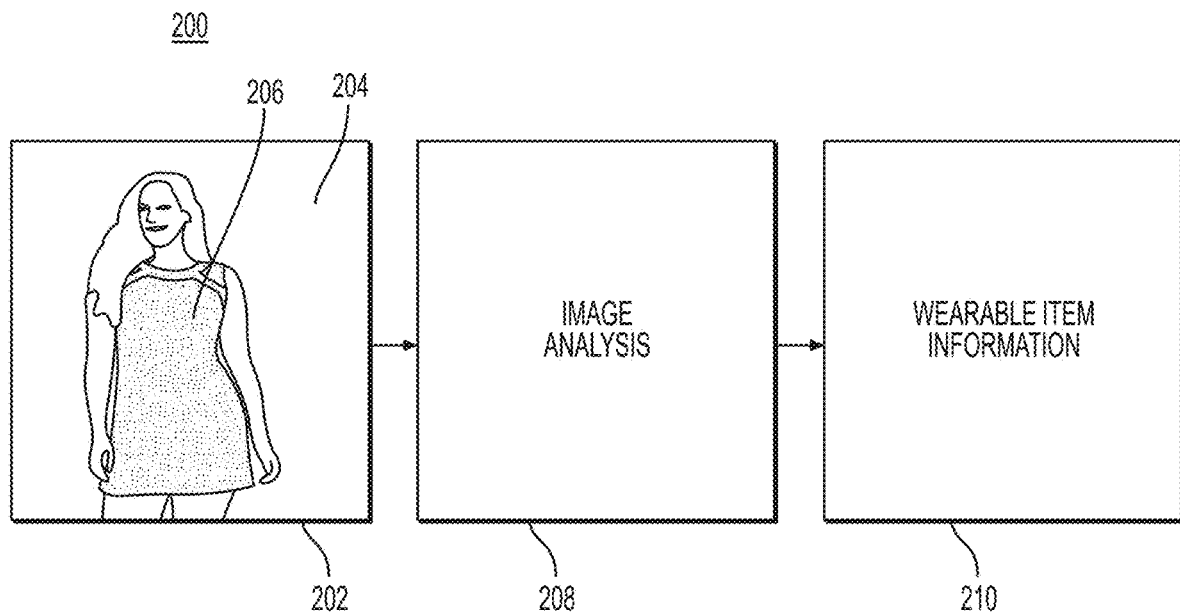
FIG. 2
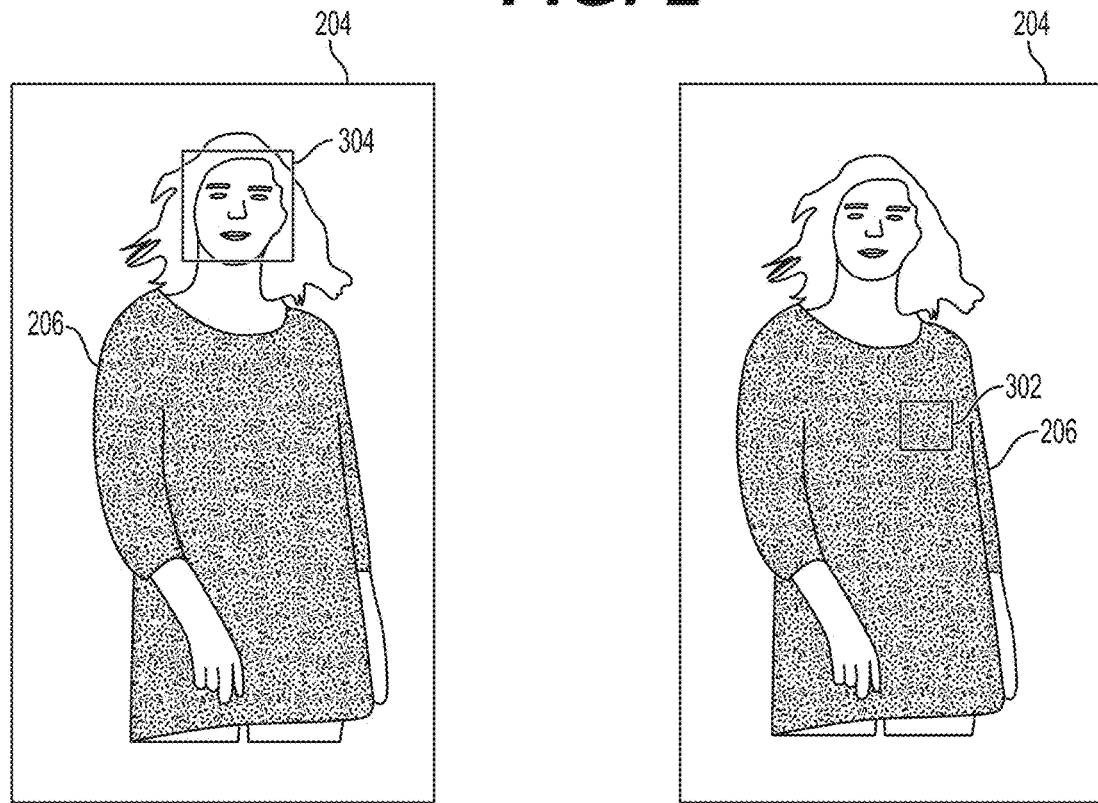
FIG. 3A  FIG. 3B

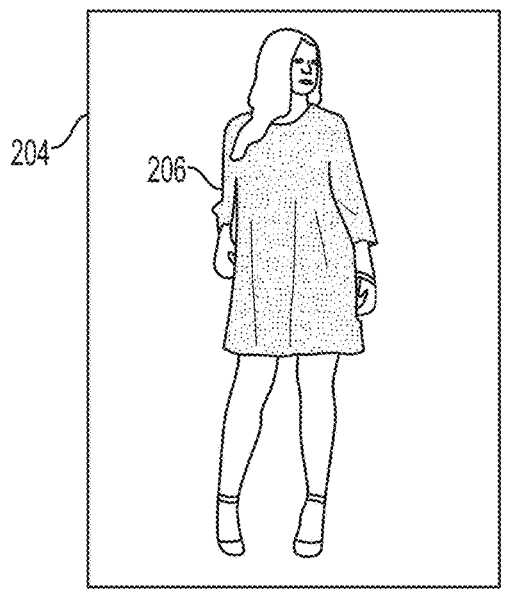
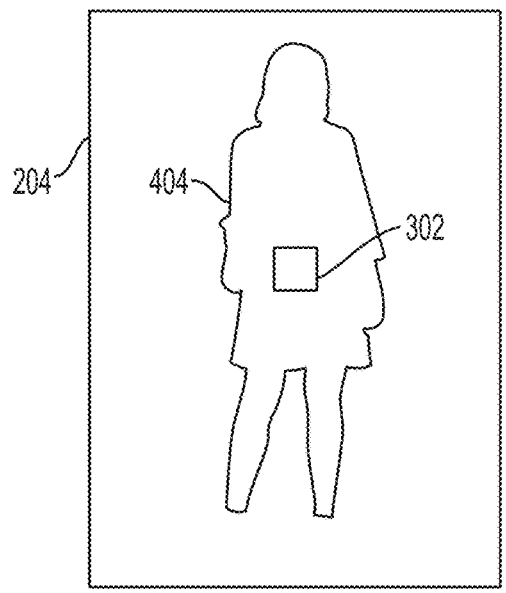
FIG. 4A  FIG. 4B
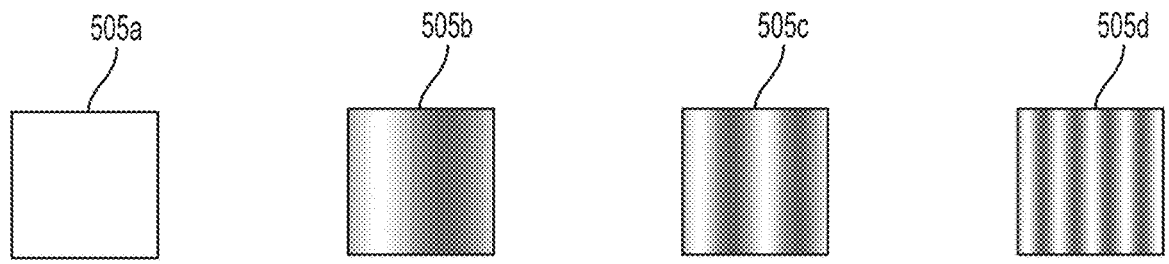
FIG. 5A
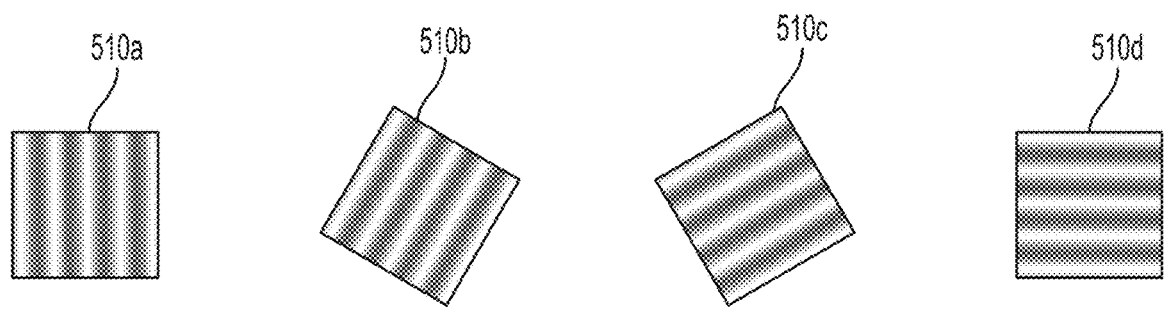
FIG. 5B

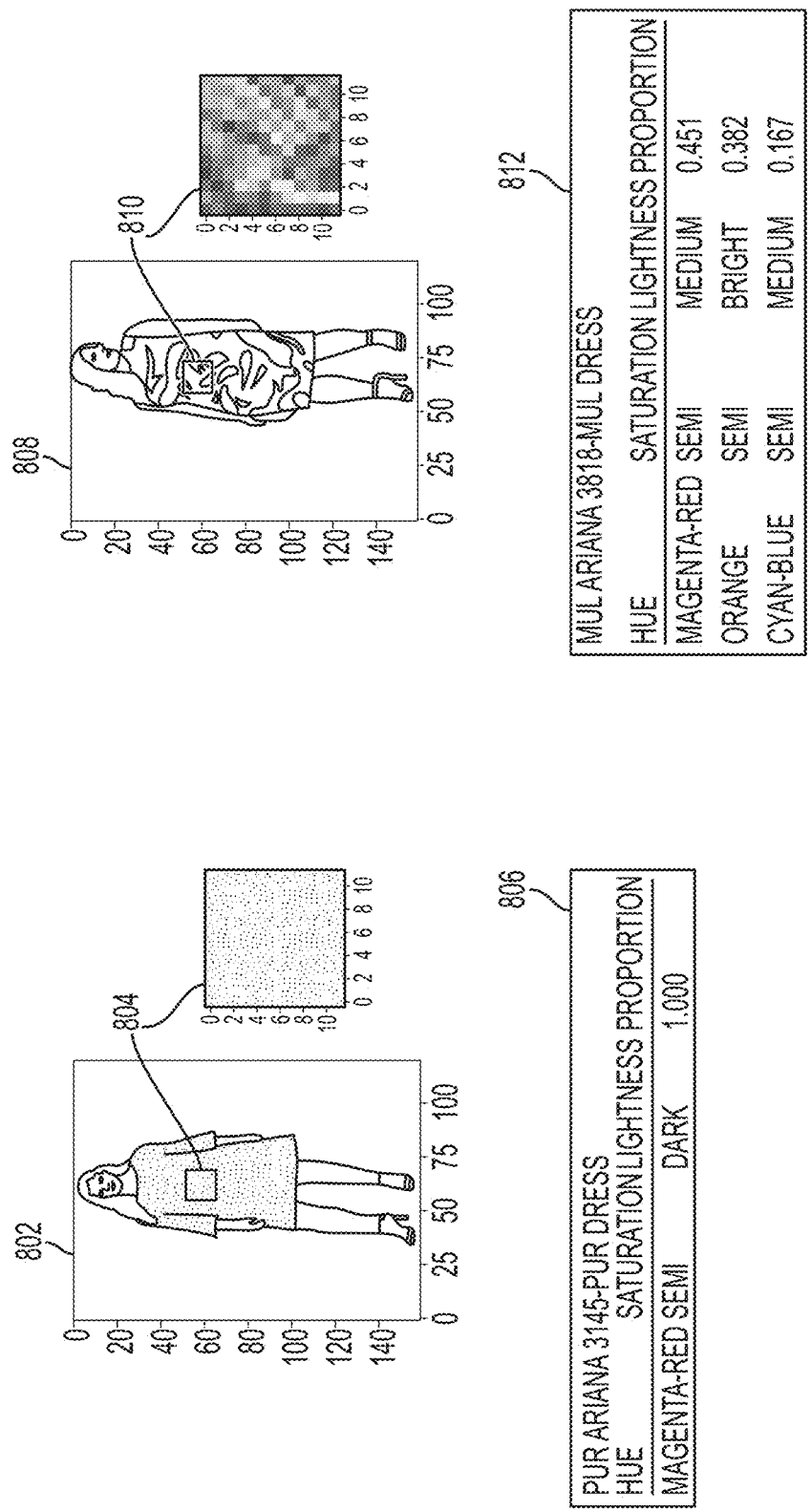

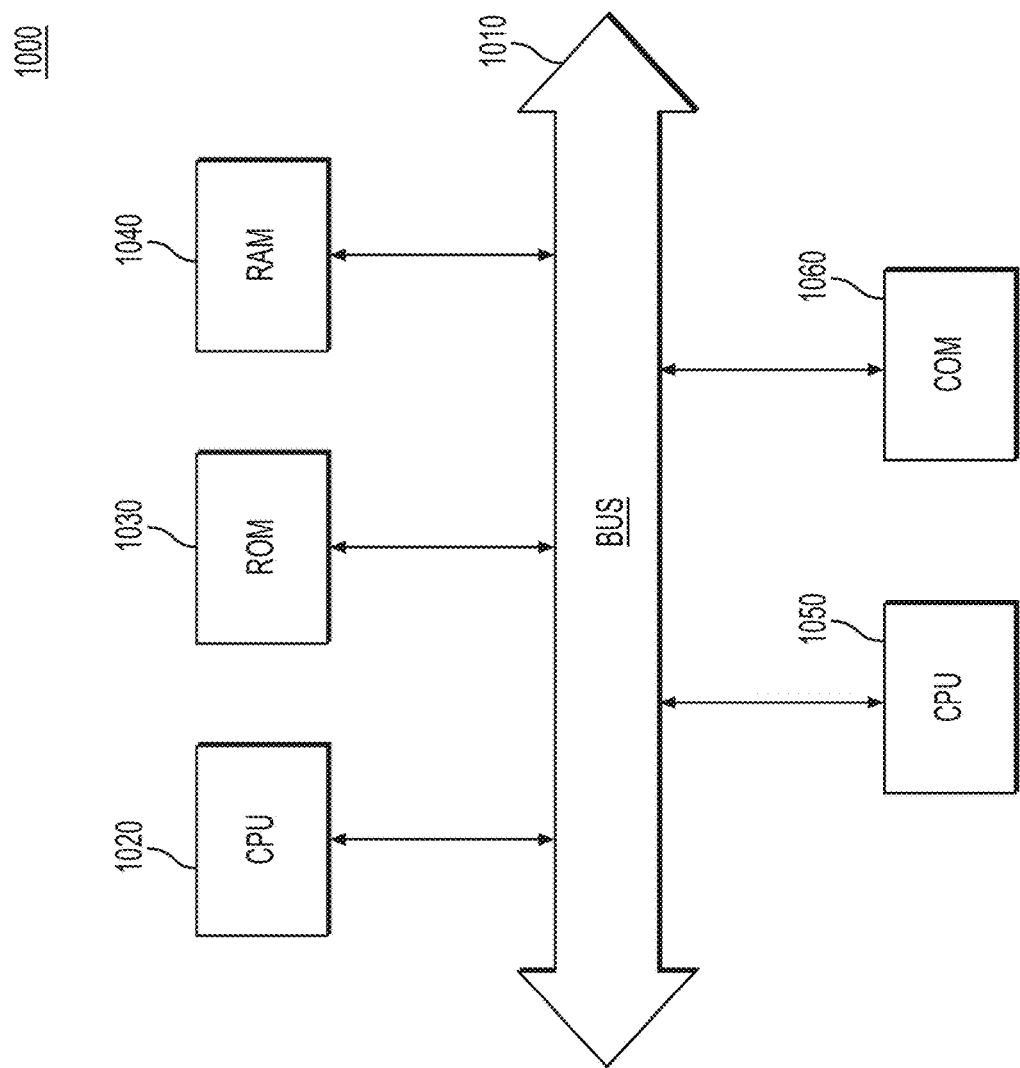

SYSTEMS AND METHODS FOR ANALYSIS OF IMAGES OF APPAREL IN A CLOTHING SUBSCRIPTION PLATFORM

CROSS REFERENCE TO RELATED APPLICATION(S)

This application is a continuation of and claims the benefit of priority to U.S. application Ser. No. 16/920,064, filed on Jul. 2, 2020, which is a continuation of and claims the benefit of priority to U.S. Ser. No. 16/594,532, filed on Oct. 7, 2019, now U.S. Pat. No. 10,726,265, which is a continuation of and claims the benefit of priority to U.S. application Ser. No. 16/514,294, filed Jul. 17, 2019, now U.S. Pat. No. 10,528,814, which is a continuation of and claims the benefit of priority to U.S. application Ser. No. 16/417,862, filed May 21, 2019, now U.S. Pat. No. 10,402,648, all of which are incorporated by reference in their entireties.

TECHNICAL FIELD

Various embodiments of the present disclosure generally relate to image processing, and more particularly, to analyzing color and pattern of a wearable item depicted in an image.

BACKGROUND

Conventional methods for image processing for object recognition generally utilize "deep learning" neural network approaches. Neural networks simulate real neural networks, such as the human brain, through simple simulated neurons (also referred to as nodes) connected through a series of layers. Such neural networks "learn" through the feedback of the correct responses provided to the neural networks. This process is also referred to as "training." In the context of neural networks, the term "deep" refers to the number of layers within a neural network where a deep network has more layers than a shallow network.

A neural network specifically designed for image processing is referred to as a Convolutional Neural Network (CNN). The convolutional layers in such neural networks filter part of the image looking for certain visual attributes. For example, one convolution might look for narrow vertical bars. CNNs have been utilized for visual object recognition. In some instances, CNNs approximate and improve upon human object recognition performance.

With respect to wearable item image analysis, a number of neural network approaches have been proposed. As an example, one available neural network approach takes a user-submitted image, recognizes a wearable item included in the image, and identifies the same or similar wearable item in an inventory. That neural network approach applies to a broad range of products in addition to wearable items. While the neural network approach described above may have some merits, there are two recognized issues with the neural network approach: (1) the significant amount of resources and (2) lack of explainability.

With respect to the first issue, the neural network approach requires a significant amount of data and computational resources to train a neural network model. As an example, a million images may be considered a typical number of images used for training a neural network model. Furthermore, such images must be pre-labeled with correct responses. For example, images of wearable items used for training must also include the correct style characteristics. For specialized uses, such as wearable item style analysis, data sets with correct style characteristics are difficult to find and/or are expensive. Moreover, the hardware (e.g., graphics processing units "GPUs" or tensor processing units "TPUs") used to train neural network models at any level of efficiency is specifically designed for neural network modeling, and is expensive to buy or rent. For example, typical third party cloud services rent GPUs for 1 to 24 dollars per hour, and a typical training run may last several days.

With respect to the second issue, while the results provided by the neural network approach may be accurate, it is difficult to explain how the neural network models reached such results. Most of the processing for neural network models is conducted in "hidden" layers between an input (e.g., an image) and an output (e.g., results). This lack of transparency makes it difficult to explain how the results were achieved, therefore making it difficult to perform an act at a functional level (e.g., providing recommendations to merchandising) based on the results provided by the neural network model.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, systems and methods are disclosed for color and pattern analysis of wearable items depicted in images to overcome the problems with conventional methods noted above. Advantages provided by the embodiments disclosed herein include avoiding training of a neural network, thus avoiding excessive costs and computational resources associated with the neural network approach. Further, the embodiments disclosed herein provide transparent and explainable results.

In one embodiment, a computer-implemented method comprises: receiving, by one or more processors, an image depicting a wearable item; identifying, by the one or more processors, the wearable item within the image by identifying a face of an individual wearing the wearable item or segmenting a foreground silhouette of the wearable item from background image portions of the image; determining, by the one or more processors, a portion of the wearable item identified within the image as being a patch portion representative of the wearable item depicted within the image; deriving, by the one or more processors, one or more patterns of the wearable item based on image analysis of the determined patch portion of the image; deriving, by the one or more processors, one or more colors of the wearable item based on image analysis of the determined patch portion of the image; and transmitting, by the one or more processors, information regarding the derived one or more colors and information regarding the derived one or more patterns.

In accordance with another embodiment, a computer system comprises: a memory having processor-readable instructions stored therein; and at least one processor configured to access the memory and execute the processor-readable instructions, which when executed by the at least one processor configures the at least one processor to perform a plurality of functions, including functions for: receiving an image depicting a wearable item; identifying the wearable item within the image by identifying a face of an individual wearing the wearable item or segmenting a foreground silhouette of the wearable item from background image portions of the image; determining a portion of the wearable item identified within the image as being a patch portion representative of the wearable item depicted within the image; deriving one or more patterns of the wearable item based on image analysis of the determined patch portion of the image; deriving one or more colors of the wearable item based on image analysis of the determined patch portion of the image; and transmitting information regarding the derived one or more colors and information regarding the derived one or more patterns.

In accordance with another embodiment, a non-transitory computer-readable medium contains instructions for: receiving an image depicting a wearable item; identifying the wearable item within the image by identifying a face of an individual wearing the wearable item or segmenting a foreground silhouette of the wearable item from background image portions of the image; determining a portion of the wearable item identified within the image as being a patch portion representative of the wearable item depicted within the image; deriving one or more patterns of the wearable item based on image analysis of the determined patch portion of the image; deriving one or more colors of the wearable item based on image analysis of the determined patch portion of the image; and transmitting information regarding the derived one or more colors and information regarding the derived one or more patterns.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 2 depicts a process for analyzing a wearable item depicted in an image, according to some embodiments.

FIGS. 3A-3B depict a method of locating a patch portion representative of a wearable item depicted within an image, according to one embodiment.

FIGS. 4A-4B depict a method of locating a patch portion representative of a wearable item depicted within an image, according to one embodiment.

FIGS. 5A-5C depict converted patches representative of a wearable item depicted within an image, according to some embodiments.

FIGS. 8A-8B depict a method of analyzing patterns according to some embodiments.

FIG. 10 depicts an exemplary computer device or system, in which embodiments of the present disclosure, or portions thereof, may be implemented.

DETAILED DESCRIPTION OF EMBODIMENTS

Figure 1:
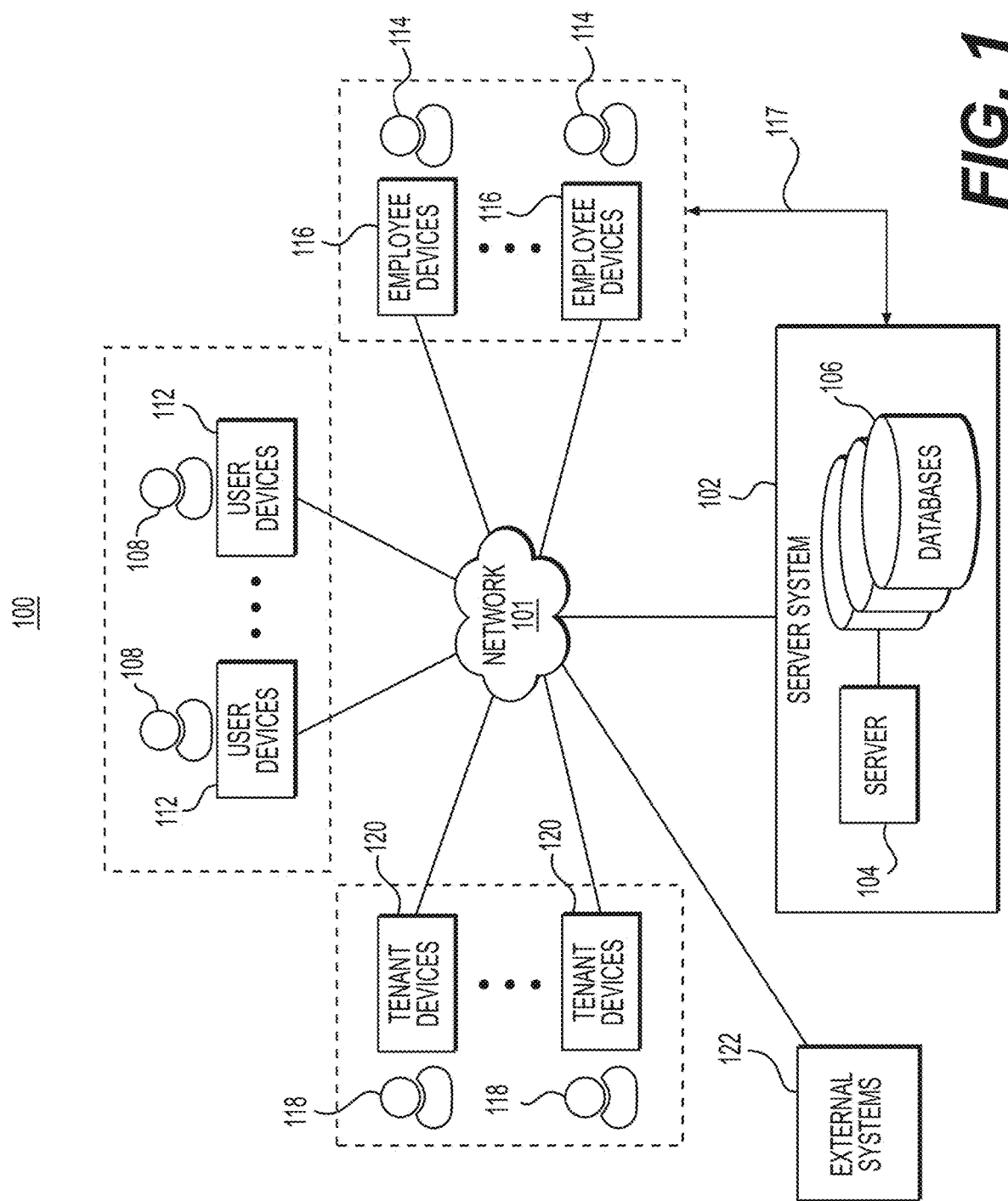
FIG. 1 depicts an example environment in which methods, systems, and other aspects of the present disclosure may be implemented.

As described above, conventional methods of wearable item image analysis typically employ neural network approaches (i.e., "deep learning"). As noted above, conventional methods for image processing using "deep learning" neural network approaches are suboptimal, especially in certain garment e-commerce, and other wearable item use cases. For example, such conventional methods are costly in terms of obtaining and utilizing input data and computational resources to train the algorithms for neural networks. Additionally, the neural network approach provides results in which the method and/or reasoning for the results are not transparent. The following embodiments describe systems and methods for analyzing images including a wearable item.

While the exemplary system architecture as described in the present disclosure relates to electronic transaction platform for subscribing to, purchasing, or renting wearable items (e.g., clothing-as-a-service (CaaS) or Try-Then-Buy (TTB) service), implementations disclosed herein may effectively serve various other online transaction platforms in the context of any other subscription, purchase, rental, or retail services without departing from the scope of the disclosure. In addition, while some descriptions and examples disclosed in the present disclosure refer to certain exemplary transaction platforms or inventories as transactions or inventories pertaining to "apparel," "garments," or "CaaS" (i.e., clothing-as-a-service), all of those transactions and/or inventories may effectively serve any wearable item (e.g., an article of clothing, apparel, jewelry, hat, accessories, or any other product which may be worn), or even hospitality linens, consumer goods, or any other textile fabrics, without departing from the scope of the disclosure.

As used in the present disclosure, the term "CaaS" (i.e., clothing-as-a-service) may collectively refer to computer-implemented services and functions associated with subscription, purchase, and/or rental services for users (e.g., periodic subscription for receiving wearable items, apparel rental or purchase order, distribution, return processing, TTB services, account management, marketing, customer service, warehouse operations, etc.). As used in the present disclosure, the term "wearable item" may refer to any article of clothing, apparel, jewelry, hat, accessories, or other product which may be worn by a person, an animal, or a thing, or be used as an ornament for a person, an animal, or a thing.

In accordance with the present disclosure, user interfaces, periodically executed computer-implemented services, ad hoc services, and automations being integrated together in a connected platform may be achieved by a uniquely configured system architecture, job execution cluster configuring one or more processors to perform both storefront and back office tasks, and various user interfaces providing specialized or customized access to users of different roles. The ordered combination of various ad hoc and automated tasks in the presently disclosed platform necessarily achieve technological improvements through the specific processes described more in detail below. In addition, the unconventional and unique aspects of these specific automation processes represent a sharp contrast to merely providing a well-known or routine environment for performing a manual or mental task.

The subject matter of the present description will now be described more fully hereinafter with reference to the accompanying drawings, which form a part thereof, and which show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter can be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

Referring now to the appended drawings, FIG. 1 shows an example environment 100, according to one or more embodiments of the present disclosure. As shown, the example environment 100 may include one or more networks 101 that interconnect a server system 102, user devices 112, employee devices 116, tenant devices 120, and external systems 122. The one or more networks 101 may be, for example, one or more of a cellular network, a public land mobile network, a local area network, a wide area network, a metropolitan area network, a telephone network, a private network, an ad hoc network, an intranet, the Internet, a fiber optic based network, a cloud computing network, etc. User devices 112 may be accessed by users 108, employee devices 116 may be accessed by authorized employees 114, and tenant devices 120 may be accessed by employees of tenant entities 118. In some implementations, employee devices 116 may be used to perform the functions of the tenant devices 120 and/or the user devices 112. Server system 102 may comprise one or more servers 104 and one or more databases 106, which may be configured to store and/or process a plurality of data, microservices, and service components, and/or associated functions thereof.

Users 108 may access the server system 102 through the one or more networks 101 using user devices 112. Each device among the user devices 112 may be any type of computing device (e.g., personal computing device, mobile computing devices, etc.) which allows users 108 to display a web browser or a web-based application for accessing the server system 102 through the network 101. The user devices 112 may, for example, be configured to display a web browser, a web-based application, or any other user interface (e.g., one or more mobile applications) for allowing users 108 to exchange information with other device(s) or system(s) in the environment 100 over the one or more networks 101. For example, a device among the user devices 110 may load an application with a graphical user interface (GUI), and the application may display on the GUI one or more apparel recommendations for closeting by the user. Users 108 accessing user devices 112 may be, for example, users and/or potential users of apparel made available for subscription-based distribution via electronic transactions and physical shipment. Additionally, or alternatively, users 108 may access user devices 112 to, for example, manage one or more user accounts, view catalogs, configure one or more user profiles, engage in customer service communications, make purchase orders, track shipments, generate shipments, monitor order fulfillment processes, initiate or process returns, order apparel for purchase, provide feedback, refer other users, navigate through various features such as size advisor, perform personalized discovery, and/or make recommendations.

Employee devices 116 may be configured to be accessed by one or more employees 114, including, for example, customer service employees, marketer employees, warehouse employees, analytics employees, or any other employees who are authorized and/or authenticated to perform tasks, operations, and/or transactions associated with the server system 102, and/or the external systems 122. In one embodiment, employee devices 116 are owned and operated by the same entity or at least an affiliate of the entity operating the e-commerce (e.g., CaaS) business hosted on server systems 102. Each device among the employee devices 116 may be any type of computing device (e.g., personal computing device, mobile computing devices, etc.). The employee devices 116 may allow employees 114 to display a web browser or an application for accessing the server system 102 and/or the external systems 122, through the one or more networks 101. For example, a device among the one or more of the employee devices 116 may load an application with graphical user interface (GUI), and the application may display on the GUI one or more warehouse operations associated with providing CaaS to users 108. In some implementations, the employee devices 116 may communicate directly with the server system 102 via communications link 117 bypassing public networks 101. Additionally, or alternatively, the employee devices 116 may communicate with the server system 102 via network 101 (e.g., access by web browsers or web-based applications).

Tenant devices 120 may be configured to be accessed by one or more tenants 118. Each device among the tenant devices 120 may be any type of computing device (e.g., personal computing device, mobile computing devices, etc.). As used herein, each tenant, among one or more tenants 118, may refer to an entity that allocates and/or supplies one or more specific collections of apparel for the CaaS inventory. For example, each of the one or more tenants 118 may be a retailer, a designer, a manufacturer, a merchandizer, or a brand owner entity that supplies one or more collections of wearable items to the CaaS inventory managed and/or accessed by the server system 102. Tenants 118 may use one or more electronic tenant interfaces (e.g., a catalog content management system associated with each tenant) to provide the server system 102 with wearable item data that describe apparel or wearable items made available for electronic transactions on server system 102. For example, one or more catalogs for each of the one or more tenants 118 may be generated and/or updated at the server system 102 dynamically and/or periodically. Tenant devices 120 may serve as access terminals for the tenants 118, for communicating with the electronic tenant interfaces and/or other subsystems hosted at the server system 102. The tenant devices 120 may, for example, be configured to display a web browser, an application, or any other user interface for allowing tenants 118 to load the electronic tenant interfaces and/or exchange data with other device(s) or system(s) in the environment 100 over the one or more networks 101.

External systems 122 may be, for example, one or more third party and/or auxiliary systems that integrate and/or communicate with the server system 102 in performing various CaaS tasks. External systems 122 may be in communication with other device(s) or system(s) in the environment 100 over the one or more networks 101. For example, external systems 122 may communicate with the server system 102 via API (application programming interface) access over the one or more networks 101, and also communicate with the employee devices 116 via web browser access over the one or more networks 101.

As indicated above, FIG. 1 is provided merely as an example. Other examples that differ from the example environment 100 of FIG. 1 are contemplated within the scope of the present embodiments. In addition, the number and arrangement of devices and networks shown in environment 100 are provided as an example. In practice, there may be additional devices, fewer devices and/or networks, different devices and/or networks, or differently arranged devices and/or networks than those shown in environment 100. Furthermore, two or more devices shown in FIG. 1 may be implemented within a single device, or a single device shown in FIG. 1 may be implemented as multiple, distributed devices. Additionally, or alternatively, one or more devices may perform one or more functions of other devices in the example environment 100. For example, employee devices 116 may be configured to perform one or more functions of tenant devices 120, in addition to their own functions.

The embodiments disclosed in further detail below may be used with respect to generating recommendations for customers. For example, customized recommendations for wearable items may be provided to a customer as the customer searches for a wearable item through the embodiments disclosed herein. The recommendations may be based on a similarity of the customer's preference to other customers' preferences or based on the wearable items the customer had previously showed an interest in and/or purchased. The analysis of colors and patterns of a wearable item depicted in an image as disclosed herein may provide attributes in order to find similar wearable items to recommend to the customer. In some embodiments, the image for analysis may be provided by a tenant and/or a customer.

Additionally, the embodiments disclosed in further detail below may be used with respect to forecasting style trends. For example, the information obtained using the color and pattern analysis as described herein may be utilized to provide predictions for further customer renting and buying trends. Such predictions may inform tenants regarding the purchase and/or availability of new inventory for rent and sale purposes.

FIG. 2 depicts a diagram showing an exemplary process 200 for analyzing an image including a wearable item according to some embodiments. In some embodiments, the server system 102 may be configured to receive and perform an analysis of an image including a wearable item as shown in FIG. 2. In some embodiments, the server system 102 may perform the analysis based on a computer-implemented algorithm. As shown in step 202 of FIG. 2, the server system 102 may receive an image 204 including a wearable item 206. In some embodiments, the server system 102 receives a description of the wearable item, e.g., a type of the wearable item, with the image 204. In some embodiments, the image 204 may be received via one or more user devices 112, one or more employee devices 116, one or more tenant devices 120, and/or external system 122. Alternatively or additionally, one or more images 204 may be stored in databases 106 and/or received from any other third party in the clothing-as-a-service computing environment.

In step 208, the server system 102 may analyze the received image 204 of the wearable item 206 and determines aspects of one or more patterns and colors included in the wearable item 206. In some embodiments, aspects of the patterns include the widths and the orientations of each of the patterns of the wearable item 206. In some embodiments, aspects of the colors include the number of colors and the type of colors of the wearable item 206. For example, the type of colors may include any combination of hue, lightness, and saturation. Some examples of hue include 12 colors from a color wheel (e.g., yellow, yellow-green, green, blue-green, blue, blue-violet, violet, red-violet, red, red-orange, orange, and yellow-orange), as well as 3 achromatic colors (e.g., white, gray, and black). Some examples of saturation include achromatic, semi-saturated, and saturated. Some examples of lightness include dark, medium, and bright. In step 210, the server system 102 transmits information associated with the wearable item 206 (hereinafter referred to as wearable item information 210) based on the analysis performed in step 208. In some embodiments, the wearable item information comprises an analysis of one or more patterns of the wearable item 206. For example, the analysis of one or more patterns of the wearable item 206 may explain whether the wearable item 206 includes a pattern that is more solid or more patterned. As another example, the pattern analysis may include an orientation of one or more patterns of the wearable item 206. In some embodiments, the information 210 comprises an analysis of one or more colors of the wearable item 206. For example, the analysis of the one or more colors may include a number of colors and proportion of the colors of the wearable item 206. As another example, the analysis of the one or more colors may include color names and types, e.g., semi-saturated vs. saturated and bright vs. dark. In some embodiments, the information 210 comprises a description and/or classification of the wearable item 206.

In some embodiments, the image analysis step 208, as shown in and described with reference to FIG. 2, comprises three processes: (1) locating a patch portion representative of the wearable item 206; (2) analyzing one or more patterns of the wearable item 206; and (3) analyzing one or more colors of the wearable item 206. The three processes will be explained in further detail below.

FIGS. 3A-3B and 4A-4B depict processes for locating a patch portion representative of the wearable item 206 depicted within the image 204 according to some embodiments. In some embodiments, the image 204 includes a person wearing the wearable item 206 with the person facing forward and the entire wearable item 206 in view. The received image 204 including the wearable item 206 may be a high resolution garment production image. In some embodiments, the server system 102 may be configured to locate the patch portion representative of the wearable item 206 depicted within the image 204.

FIGS. 3A-3B depict a method of locating a patch 302 representative of the wearable item 206 depicted within the image 204 according to an embodiment. As shown in FIG. 3A, the server system 102 receives an image 204 depicting a model wearing a wearable item 206. The server system 102 then estimates the position and the width of a face (hereinafter referred to as the face portion 304) of the model within the received image. In some embodiments, a face finding algorithm is used to estimate the face portion 304 as shown in FIG. 3A. For example, the automated Haar Cascade face finding algorithm may be used to locate the face of the model. The patch 302 representative of the wearable item 206 may be determined by locating a portion within the image at a position relative to the position of the estimated face portion 304 as shown in FIG. 3B.

In some embodiments, the relative position of the patch 302 may be different based on the type of wearable item 206. For example, the relative position of the patch 302 for a pair of pants may be different from the relative position of the patch 302 for a skirt. In some embodiments, a rectangular filter is used to determine the face portion 304 and the patch 302. In some embodiments, a rectangular unit (hereinafter referred to as a face unit) based on the width and height of the face may be used to determine the relative position of the patch 302. For example, the patch 302 for a pair of pants may be located by moving four face units down from the bottom of the face portion 304 and a half face unit to the right of the center of the face portion 304 in order to avoid the zipper. In some embodiments, the width of the patch 302 may be determined based on a width of the face unit. For example, the width of the patch 302 may be configured as a half of a face unit.

FIGS. 4A-4B depict a method of locating a patch 302 representative of the wearable item 206 depicted within the image 204 according to an embodiment. As shown in FIG. 4A, the server system 102 receives an image 204 depicting a model wearing a wearable item 206. A silhouette 404 of the model wearing the wearable item 206 may be segmented and labelled as foreground relative to everything else in the image 204, which may be labelled as background, as shown in FIG. 4B. In some embodiments, a computerized algorithm, such as the Grabcut algorithm, may be utilized to segment, label, and use the silhouette 404. A center of the silhouette 404 may be located and the patch 302 may be determined based on a relative position to the center of the silhouette 404. For example, the patch 302 may be identified as a portion of the image 204 located a half face unit down and to the right of the center of the silhouette 404. In some embodiments, the face unit for this method of locating the patch 302 may be determined based on an average face width from previous image analyses.

In some embodiments, a face unit is determined based on the face portion 304 in the received image 204 as described above with reference to FIGS. 3A-3B. In other embodiments, the face unit is determined based on an average face width from previous image analyses as described above with reference to FIGS. 4A-4B. In some embodiments, a combination of different methods of face unit determination may be used. For example, the face unit may be determined based on the average face width from previous image analyses if the face finding algorithm fails to locate a face in an image and determine a face unit directly from the image. The width of the determined face unit is used as a unit distance for the width of the patch 302, and as a unit distance for the pattern analysis as described in further detail below.

FIGS. 5A-5C, 6A-6B, and 7A-7C depict processes for analyzing one or more patterns of the wearable item 206 according to some embodiments. In some embodiments, the server system 102 may be configured to perform an analysis of one or more patterns of the wearable item 206.

In some embodiments, the server system 102 obtains the image 204 and the coordinates of the patch 302 representative of the wearable item 206 depicted in the image 204 and performs a Fast Fourier Transform (FFT) of the patch 302. The FFT converts the patch 302 into components of sine waves of different widths, orientations, and phases. FIG. 5A shows various converted patches 505a-d including components of sine waves in varying widths according to some embodiments. As shown in FIG. 5A, converted patch 505a does not have any sine wave components while converted patch 505b has one sine wave component. Converted patch 505c has two sine wave components and converted patch 505d has four sine wave components. The different widths of the sine wave components indicate different frequencies and such widths are described as cycles per unit length. For example, converted patch 505a has zero cycles, converted patch 505b has one cycle, converted patch 505c has two cycles, and converted patch 505d has four cycles. In some embodiments, a face unit is used as the unit. Accordingly, the different frequencies included in the converted patch 505a-d may be indicated as cycles per face (cpf). In the context of image processing, frequencies indicate spatial frequencies. Referring back to FIG. 5A, converted patch 505a can be explained as having zero cpf, which indicates that the patch is of a solid color. Similarly, converted patch 505b has one cpf, which indicates a low spatial frequency and converted patch 505d has four cpf, which indicates a relatively higher spatial frequency. In some embodiments, zero to ten cpf may indicate a low spatial frequency, i.e., a relatively wide pattern, and ten to twenty cpf may indicate a high spatial frequency, i.e., a relatively narrow pattern.

Figure 5C:
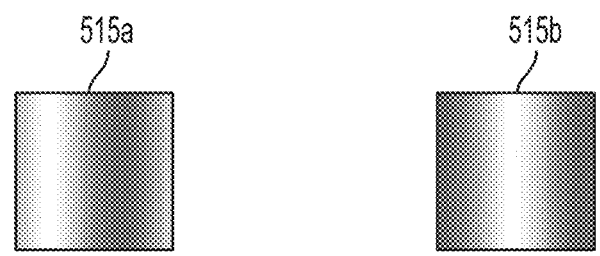

FIG. 5B shows various converted patches 510a-d in varying orientations according to some embodiments. The various orientations of the converted patches 510a-d indicate a direction of the pattern. FIG. 5C shows converted patches 515a-b with varying phases according to some embodiments. A cycle for converted patch 515a may start with a relatively bright portion of the cycle as shown on the left side of the converted patch 515a. A cycle for converted patch 515b may start with a relatively dark portion of the cycle as shown on the left side of the converted patch 515b. As shown in FIG. 5C, the relatively bright portion of the cycle in converted patch 515b may have shifted by about a fourth of the cycle to the right from the relatively bright portion of the cycle in converted patch 515a. This shift may be referred to as a phase shift.

Figure 6A:
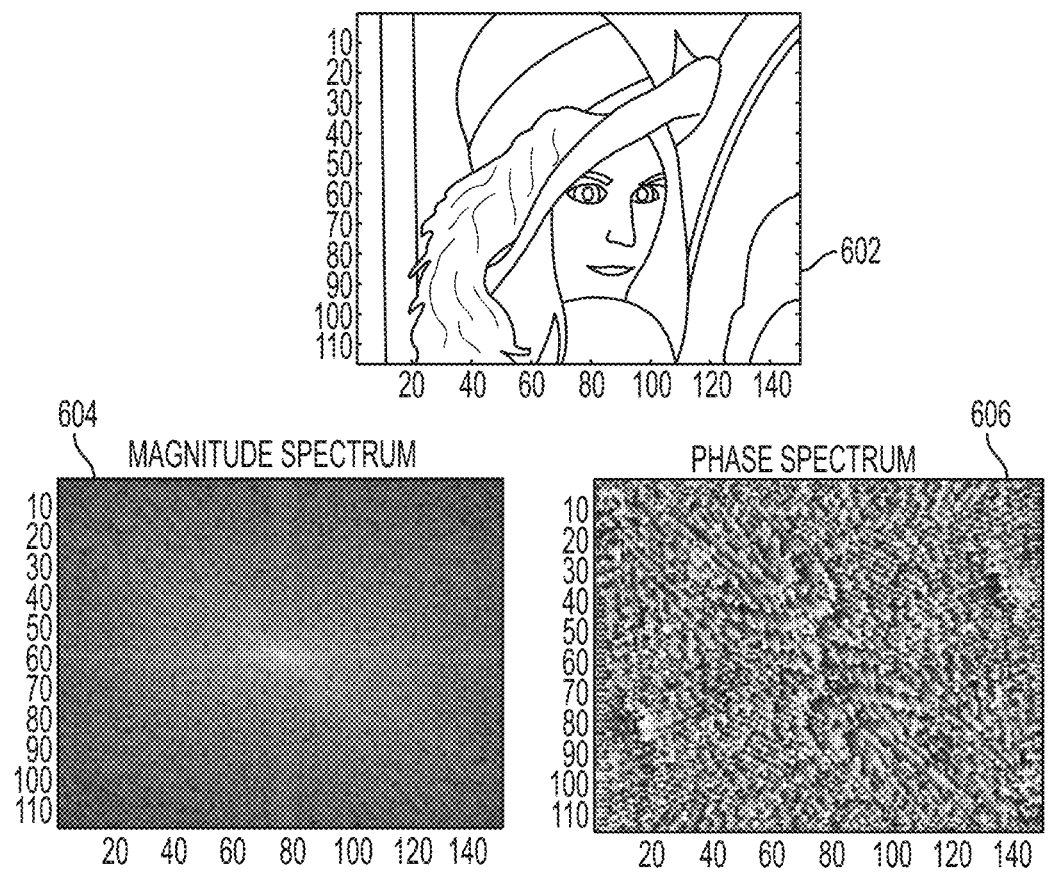
FIGS. 6A-6C depict a method of analyzing patterns of wearable items depicted within images, according to some embodiments.
Figure 6B:
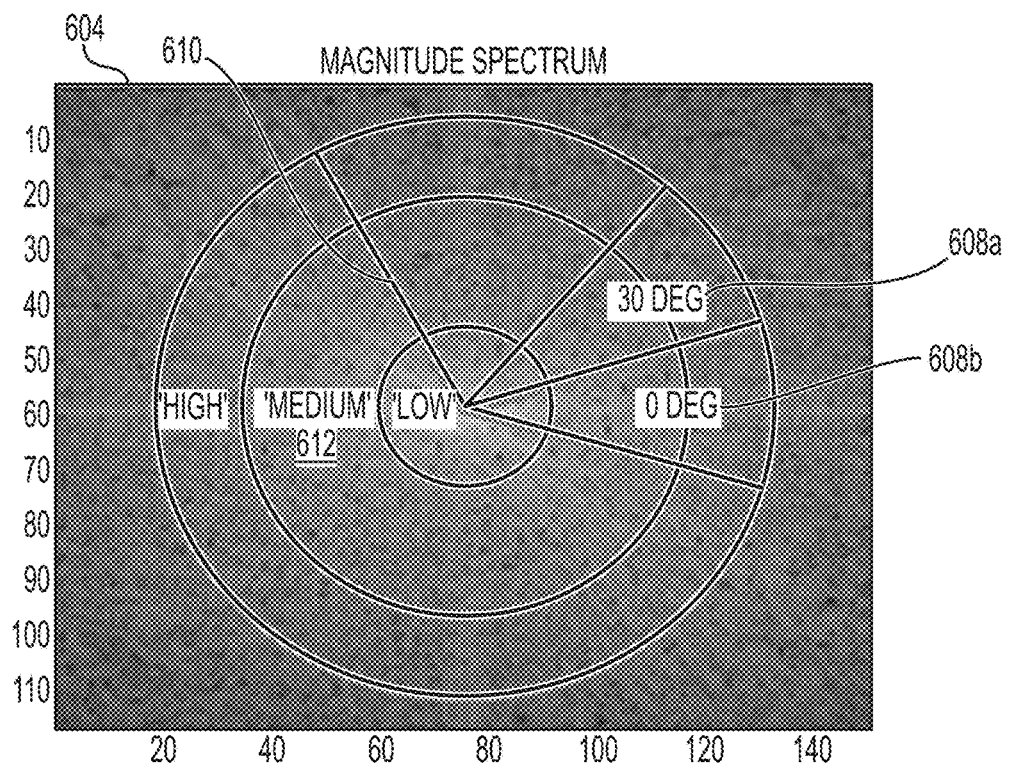

FIGS. 6A-6B show an example of a FFT of an image according to one embodiment. As shown in FIG. 6A, the FFT of an image 602 provides a two dimensional polar plot of a magnitude spectrum plot 604 and a two dimensional polar plot of a phase spectrum 606. The phase spectrum 606 may depict the horizontal shift (along an axis of orientation) of sinusoidal components comprising the FFT of the image 602 according to some embodiments. In some embodiments, the horizontal shift of the sinusoidal components may be used to determine positions of patterns in the image 602. The magnitude spectrum plot 604 depicts the power for separate components in terms of spatial frequency and orientation on a two dimensional polar plot. As shown in FIG. 6B, a distance from the center of the magnitude spectrum plot 604 indicates the spatial frequency. That is, the center of the magnitude spectrum plot 604 indicates zero spatial frequency and an increasing radius 610 from the center indicates increasing spatial frequency. For example, the further away from the center of the magnitude spectrum plot 604, the higher the spatial frequency. Accordingly, the center of the magnitude spectrum plot 604 may be indicated as 0 cpf. Additionally, each angle with an endpoint at the center of the magnitude spectrum plot 604 indicates an orientation. Such angles with endpoints may also be referred to as "orientation bands," which cover various orientation ranges, e.g., the 0 degree orientation band 608a with a 30 degree width ranging from −15 to 15 degrees and the 30 degree orientation band 608b with a 30 degree width ranging from 15 to 45 degrees.

In some embodiments, the magnitude spectrum plot of a patch portion representative of a wearable item depicted in an image may be used to derive a power spectrum. In some embodiments, there are two types of power spectrum: (1) a spatial frequency power spectrum, and (2) an orientation power spectrum.

Figure 7A:
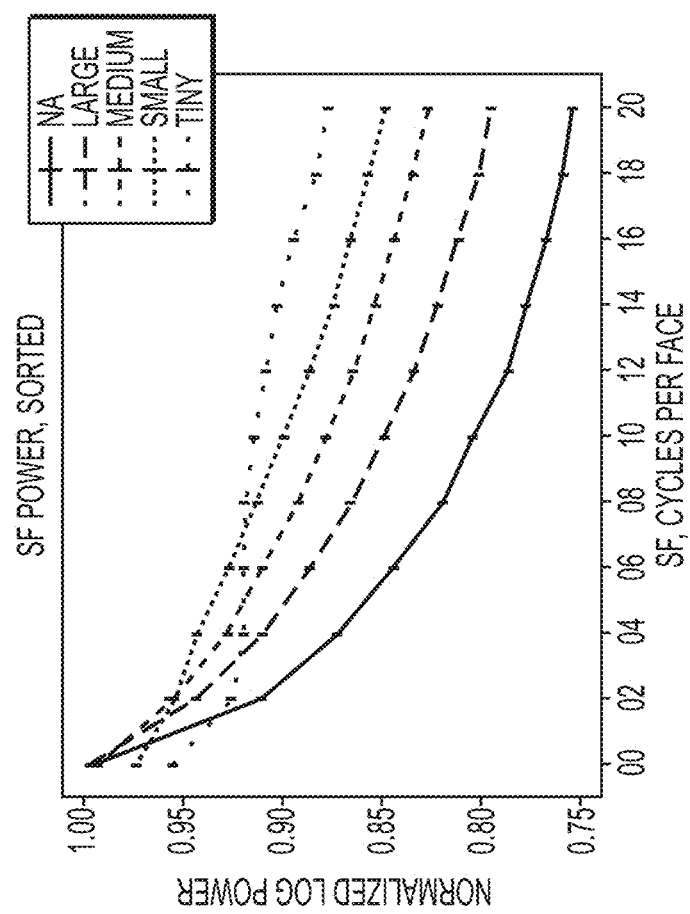
FIG. 7A-7D depict power spectra according to some embodiments.

For the spatial frequency power spectrum, the power within a range of spatial frequencies, e.g., a 'medium' ring 612 covering a range of distances from the center of the magnitude spectrum plot 604, is summed to derive the power spectrum. For example, the magnitudes within the entire area of the medium ring 612 is first squared to find the power and then summed, which provides the power for the medium spatial frequency band. In some instances, the power across all spatial frequencies is log normalized. More specifically, the logarithm of power (also referred to as the log power) for each spatial frequency band is calculated. The log power is then normalized. That is, the log power is rescaled such that the maximum log power is equal to 1. FIG. 7A depicts an example of spatial frequency power spectra with spatial frequency bands of 2 cpf according to some embodiments. The power spectra depicted in FIG. 7A represents the power spectra for 3,000 wearable items grouped (by merchandising labels) for pattern scale. The N/A shown in FIG. 7A may indicate 'not applicable,' or a solid pattern. In some instances, the pattern scale, listed from largest to smallest, may be: N/A, large, medium, small, and tiny. As shown in FIG. 7A, the power spectra in aggregate are ordered according to each respective pattern scale label. As an example, for high spatial frequencies above 10 cpf, the 'tiny' labels may have the greatest 'amount' (i.e., greater magnitudes) of high spatial frequencies. The greatest amount of high spatial frequencies above 10 cpf are listed in descending order as follows: small, medium, large, and N/A.

Figure 6C:
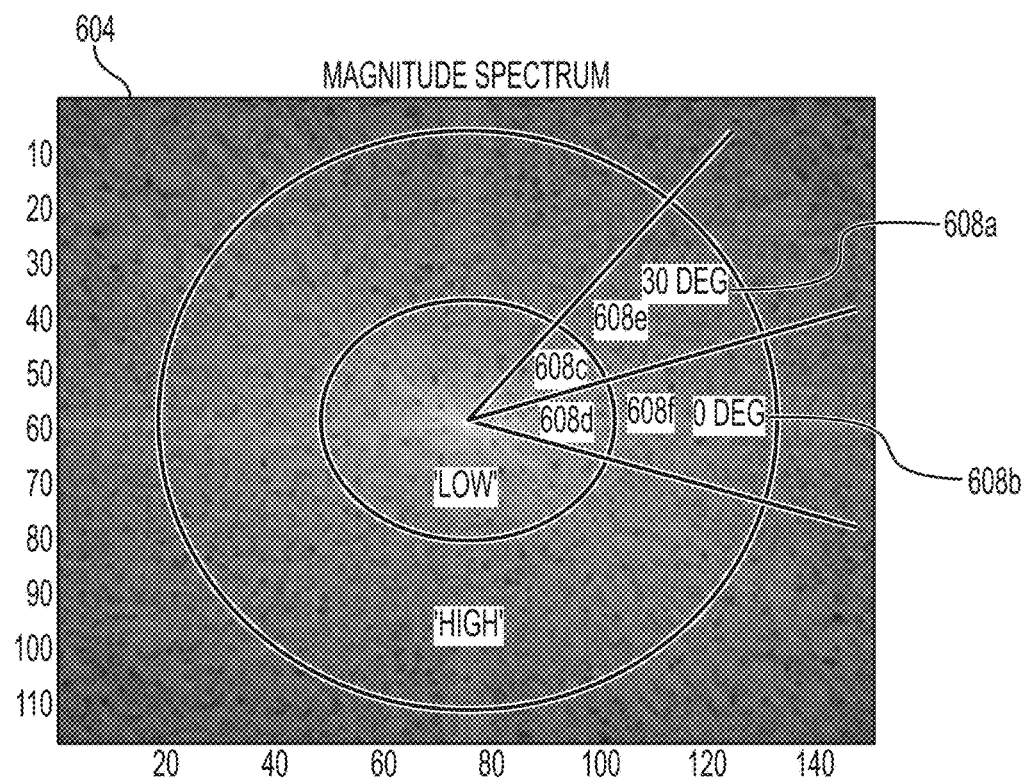
Figure 7B:
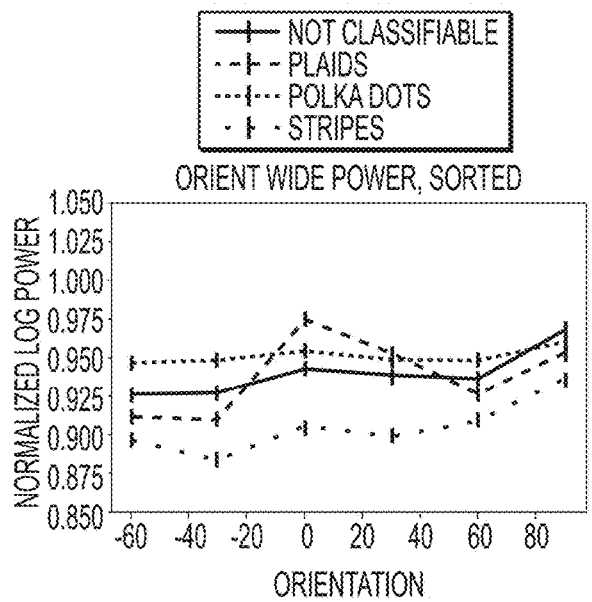
Figure 7C:
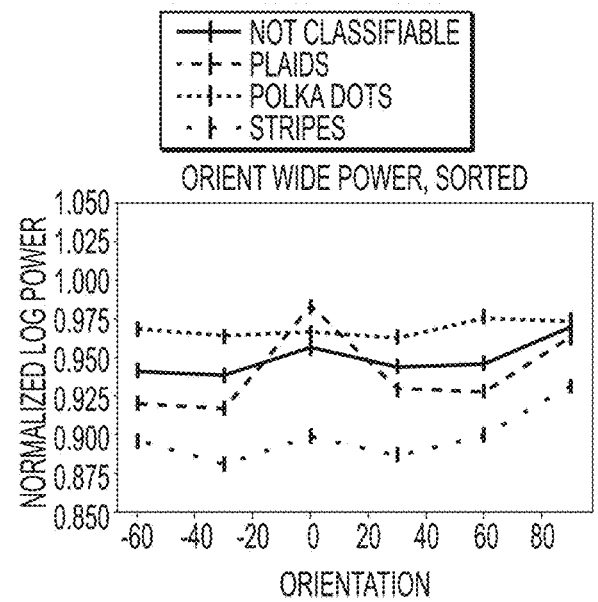
Figure 7D:
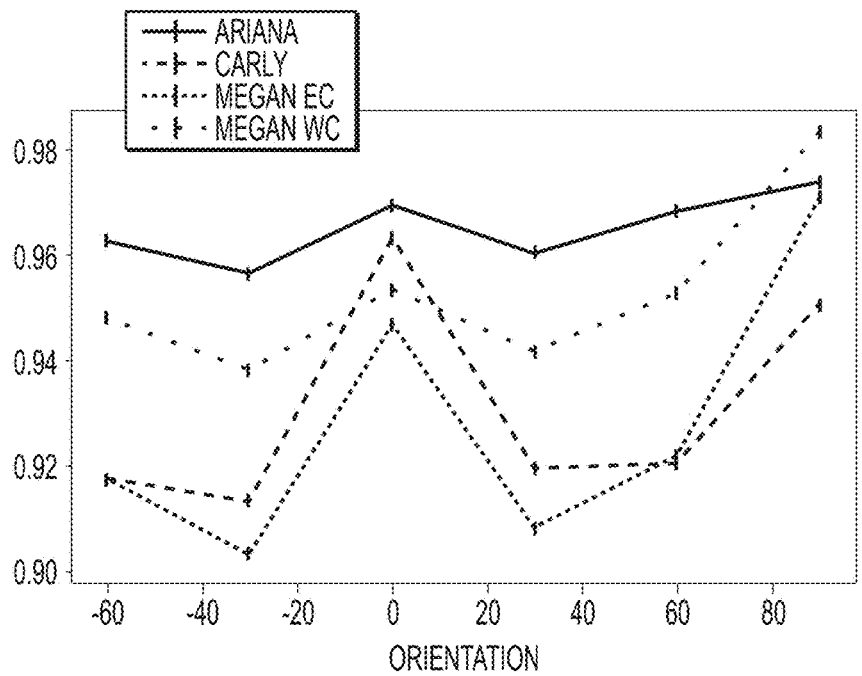

Referring now to the orientation power spectrum, the power within a certain orientation band, e.g., the 0 degree orientation band 608a or the 30 degree orientation band 608b, may be summed to derive the power spectrum. In some embodiments, there may be two types of orientation power spectra: (1) a power spectrum for lower spatial frequencies 608c-d, and (2) a power spectrum for high spatial frequencies 608e-f, as shown in FIG. 6C. As shown in FIG. 7B, the power spectrum for lower spatial frequencies may cover a range of 0 to 10 cpf (wide patterns) for several orientation bands, e.g., −60 degree orientation band, −30 orientation band, etc. As shown in FIG. 7C, the power spectrum for higher spatial frequencies may cover a range of 10 to 20 cpf (narrow patterns) for the several orientation bands. The 0 degree orientation band may indicate a horizontal orientation of a pattern and the 90 degree orientation band may indicate a vertical orientation of a pattern. FIGS. 7B-7C show the relative power of patterns at various orientations according to some embodiments. As shown in FIGS. 7B-7C, the spectra for the polka dots pattern is depicted as relatively flat. This is because the circular patterns that dictate polka dot patterns do not have a dominant orientation. Referring again to FIGS. 7B-7C, the relative amount for a plaid pattern tends to peak at the 0 degree orientation band (the horizontal orientation) and the 90 degree orientation band (the vertical orientation). This is because plaid patterns generally have a strong pattern of horizontal and vertical striping. In some embodiments, the spectra for striped pattern and non-classifiable patterns may also be provided as shown in FIGS. 7B-7C. FIG. 7D shows another example of orientation power spectra for wearable items of various garment types according to some embodiments. In some instances, the various garment types may be referred to as "garment personae." Based on the orientation spectra shown in FIG. 7D, it may be determined that an Ariana garment personae, a specific garment type, includes wearable items of more oblique or circular patterns, a Carly garment personae, another specific garment type, includes wearable items with horizontal and vertical stripes with relatively more horizontal stripes, a Megan EC garment personae, another specific garment type, includes wearable items with horizontal and vertical stripes with relatively more vertical stripes, and a Megan WC garment personae, yet another specific argument type, includes slightly more vertical patterns than the Ariana garment personae.

In some embodiments, the analysis of one or more patterns of the wearable item may output spatial frequency power spectra as shown in FIG. 7A with 0 to 20 cpf. In some embodiments, the analysis of one or more patterns of the wearable item may output orientation power spectra as shown in FIG. 7B from −60 degrees to 90 degrees in 30 degree orientation bands covering a range of spatial frequencies from 0 to 10. In some embodiments, the analysis of one or more patterns of the wearable item may output orientation power spectra as shown in FIG. 7C from −60 degrees to 90 degrees in 30 degree orientation bands covering a range of spatial frequencies from 10 to 20. As shown in FIGS. 7A-7D, all power spectra are first log transformed, then normalized so that the maximum is 1.

FIGS. 8A and 8B depict color analyses of the wearable item 206 according to some embodiments. In some embodiments, the server system 102 may be configured to perform an analysis of one or more colors of the wearable item 206. In one embodiment, the server system 102 obtains the image 204 and the coordinates of the patch 302 representative of the wearable item 206 depicted in the image 204. In the first step for the color analysis, the server system 102 may convert Red, Green, and Blue (RGB) values of each pixel within the patch 302 to Hue, Saturation, and Lightness (HSL) values.

In the second step for the color analysis, the server system 102 may estimate the number of colors in the patch 302 based on the converted HSL values. In some embodiments, a computer-implemented algorithm is used to search for clusters of HSL values to estimate the number of colors in the patch 302. In such embodiments, a k-means clustering may be used to obtain a range of cluster numbers for the patch 302. The general hypothesis behind the k-means clustering is that a single color will be represented across a number of pixels by a cluster of nearby HSL values. In some embodiments, the spread of HSL values may be due to variations caused by differences in illumination and orientation. The server system 102 then determines the number of clusters, i.e., the number of colors in the patch 302, based on two criteria: (1) threshold cluster distance; and (2) threshold root mean square error (RMSE). For determinations based on the threshold cluster distance, a cluster is rejected if a distance between a cluster center and a neighboring cluster center is below a predetermined threshold. The distance between cluster centers is a Euclidean distance in HSL coordinates. The threshold cluster distance imposes a closeness constraint on the colors in the patch 302. For determinations based on the threshold root mean squared error (RMSE), a cluster is rejected if the RMSE is larger than a predetermined RMSE threshold where the RMSE is measured for the entire patch 302 as the mean Euclidean distance from each pixel's closest cluster center in HSL space. The threshold RMSE prevents a cluster from having a spread too large. That is, the threshold RMSE prevents one cluster from representing more than one color. In some embodiments, a maximum number of clusters may be set for the k-means clustering. Each cluster represents a certain HSL value.

In the third step for the color analysis, the server system 102 categorizes each cluster based on the associated HSL value. Some exemplary categories for hue may include 12 colors from a color wheel (e.g., yellow, yellow-green, green, blue-green, blue, blue-violet, violet, red-violet, red, red-orange, orange, and yellow-orange), as well as 3 achromatic colors (e.g., white, gray, and black). Some exemplary categories for saturation may include achromatic, semi-saturated, and saturated. Some exemplary categories for lightness may include dark, medium, and bright.

In a fourth step for the color analysis, the server system 102 combines clusters that are categorized identically. For example, two clusters with the same color name, saturation category, and lightness category are considered to be the same color. In such embodiments, the new HSL value for the combined color is the simple Euclidean mean of the combined clusters.

In a fifth step for the color analysis, the server system 102 summarizes the color information for the patch 302 based on the categorized clusters in the previous steps, e.g., third and fourth steps. The summary may include the attributes: number of colors, proportion of achromatic, semi-saturated, and saturated colors, proportion of light, medium, and dark colors, and a color contrast. In some embodiments, the color contrast is determined as the average HSL Euclidean distance between the colors in the patch. In some embodiments, the summary may include the three dominant colors, i.e., the three most frequent colors, in the patch 302. In such embodiments, information regarding the three most dominant colors may include the hue name, saturation category, lightness category, and the proportion of the dominant color in the patch 302.

FIGS. 8A-8B show exemplary summaries for images as a result of a color analysis. FIGS. 8A-8B each shows an image 802, 808 including a wearable item and a patch 804, 810 representative of the wearable item. The color analysis summary 806, 812 lists the dominant colors of the wearable item in addition to the saturation, lightness, and proportion of each of the dominant colors. In some embodiments, the color analysis summary may include one or more of: total number of colors in the patch, proportion of achromatic colors in the patch, proportion of semi-saturated colors in the patch, proportion of saturated colors in the patch, proportion of dark colors in the patch, proportion of medium colors in the patch, proportion of bright colors in the patch, average color contrast of the patch measured in HSL Euclidean coordinates, hue name of the dominant (most frequent) color in the patch, saturation category of the dominant (most frequent) color in the patch, lightness category of the dominant (most frequent) color in the patch, proportion of the dominant (most frequent) color in the patch, hue name of the second (most frequent) color in the patch, saturation category of the second (most frequent) color in the patch, lightness category of the second (most frequent) color in the patch, proportion of the second (most frequent) color in the patch, hue name of the third (most frequent) color in the patch, saturation category of the third (most frequent) color in the patch, lightness category of the third (most frequent) color in the patch, and proportion of the third (most frequent) color in the patch.

Figure 9:
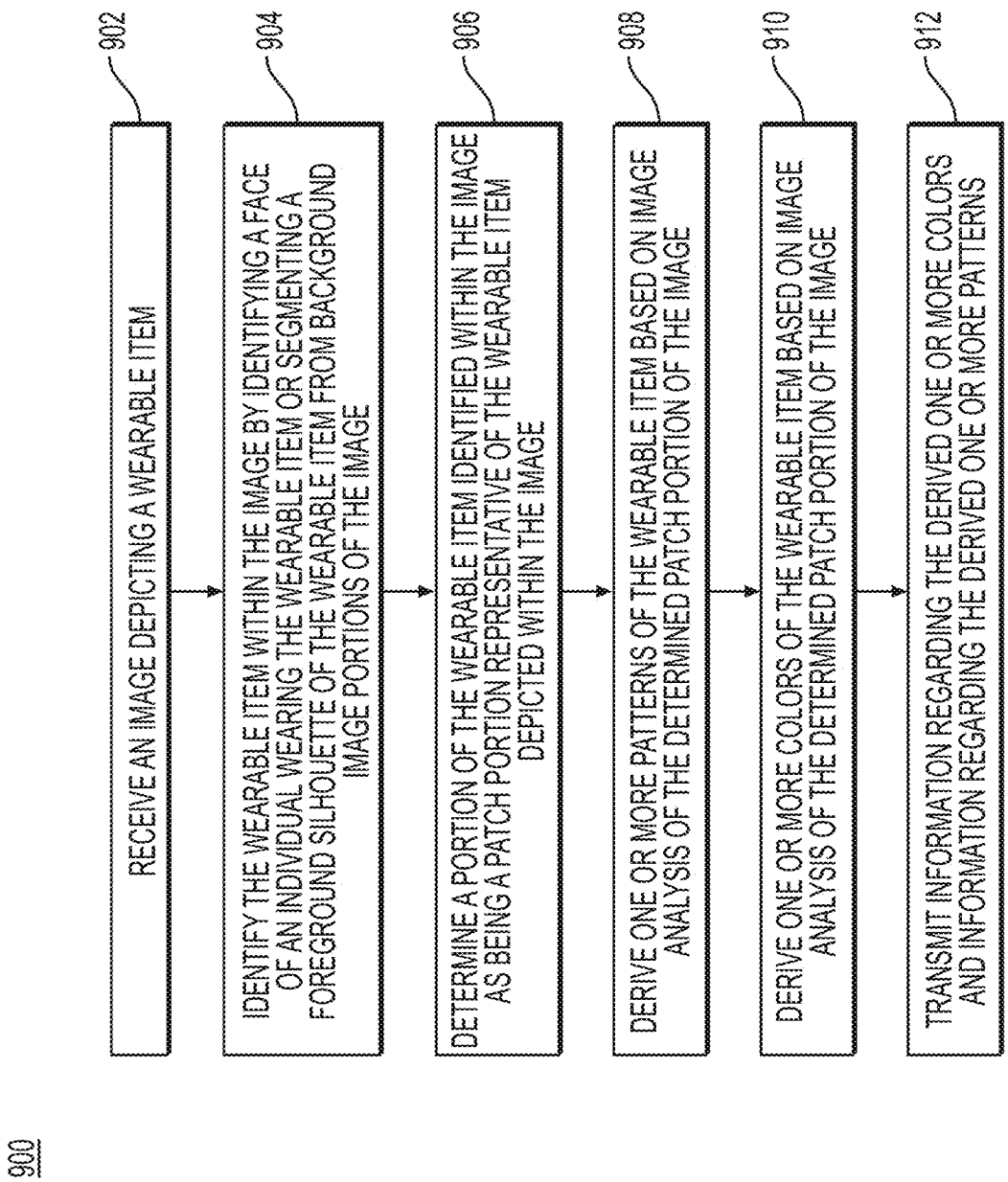
FIG. 9 depicts an exemplary method for analyzing a wearable item depicted in an image according to some embodiments.

FIG. 9 depicts an exemplary method 900 for performing color and pattern analysis of images including wearable items. The method 900 includes step 902, in which one or more processors (e.g., one or more processors of the server system 102) may receive an image depicting a wearable item. For example, as described above, server system 102 may receive one or more images of wearable items from any other devices within a clothing-as-a-service environment, or otherwise over the Internet. In step 904, the one or more processors may identify the wearable item within the image by identifying a face of an individual wearing the wearable item or segmenting a foreground silhouette of the wearable item from background image portions of the image. In step 906, the one or more processors may determine a portion of the wearable item identified within the image as being a patch portion representative of the wearable item depicted within the image. In step 908, the one or more processors may derive one or more patterns of the wearable item based on image analysis of the determined patch portion of the image. In step 910, the one or more processors may derive one or more colors of the wearable item based on image analysis of the determined patch portion of the image. In step 912, the one or more processors may transmit information regarding the derived one or more colors and information regarding the derived one or more patterns.

In some embodiments, determining the portion of the wearable item identified within the image as being the patch portion representative of the wearable item depicted within the image comprises locating a portion within the image at a predetermined distance and direction from the identified face of the individual wearing the wearable item; and determining the located portion within the image as the patch portion representative of the wearable item depicted within the image.

In some embodiments, determining the portion of the wearable item identified within the image as being the patch portion representative of the wearable item depicted within the image comprises locating a center portion of the segmented foreground silhouette of the wearable item; and determining the located center portion as the patch portion representative of the wearable item depicted within the image.

In some embodiments, a size of the patch portion representative of the wearable item depicted within the image is based on a size of the identified face of the individual wearing the wearable item.

In some embodiments, deriving the one or more patterns of the wearable item based on image analysis of the determined patch portion of the image performing a fast Fourier transform, FFT, of the determined patch portion of the image; and deriving at least one of an orientation and a width for each of the one or more patterns based on the FFT of the patch.

In some embodiments, deriving one or more colors of the wearable item based on image analysis of the determined patch portion of the image comprises converting the determined patch portion of the image from a Red, Green, Blue (RGB) color model to a Hue, Saturation, Lightness (HSL) color model; and estimating a number of colors included in the converted patch portion of the image.

In some embodiments, estimating the number of colors included in the converted patch portion of the image comprises determining one or more clusters of pixels included in the converted patch portion of the image, wherein a first cluster and a second cluster are separated by a predetermined distance threshold, and wherein each of the first cluster and the second cluster comprises pixels with a root mean square error (RMSE) smaller than a predetermined RMSE threshold.

In some embodiments, estimating the number of colors included in the converted patch portion of the image further comprises identifying a cluster center for each of the determined one or more clusters of pixels; classifying the identified cluster center for each of the determined one or more clusters of pixels into categorical values of hue, saturation, and lightness; and estimating the number of colors based on the classified one or more cluster centers.

In some embodiments, receiving the image depicting the wearable item comprises receiving the image depicting the wearable item from one or more of an electronic tenant interface and a user interface.

In some embodiments, the method 900 further includes the step of classifying the wearable item within the image based on one or more of the information regarding the derived one or more colors and the information regarding the derived one or more patterns.

As shown in FIG. 10, a device 1000 used for performing the various embodiments of the present disclosure (e.g., the server system 102, the user devices 112, the employee devices 116, the tenant devices 120, and/or any other computer system or user terminal for performing the various embodiments of the present disclosure) may include a central processing unit (CPU) 1020. CPU 1020 may be any type of processor device including, for example, any type of special purpose or a general-purpose microprocessor device. As will be appreciated by persons skilled in the relevant art, CPU 1020 also may be a single processor in a multi-core/multiprocessor system, such system operating alone, or in a cluster of computing devices operating in a cluster or server farm. CPU 1020 may be connected to a data communication infrastructure 1010, for example, a bus, message queue, network, or multi-core message-passing scheme.

A device 1000 (e.g., the server system 102, the user devices 112, the employee devices 116, the tenant devices 120, and/or any other computer system or user terminal for performing the various embodiments of the present disclosure) may also include a main memory 1040, for example, random access memory (RAM), and may also include a secondary memory 1030. Secondary memory, e.g., a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage unit may comprise a floppy disk, magnetic tape, optical disk, etc., which is read by and written to by the removable storage drive. As will be appreciated by persons skilled in the relevant art, such a removable storage unit generally includes a computer usable storage medium having stored therein computer software and/or data.

In alternative implementations, secondary memory 1030 may include other similar means for allowing computer programs or other instructions to be loaded into device 1000. Examples of such means may include a program cartridge and cartridge interface (such as that found in video game devices), a removable memory chip (such as an EPROM, or PROM) and associated socket, and other removable storage units and interfaces, which allow software and data to be transferred from a removable storage unit to device 1000.

A device 1000 may also include a communications interface ("COM") 1060. Communications interface 1060 allows software and data to be transferred between device 1000 and external devices. Communications interface 1060 may include a modem, a network interface (such as an Ethernet card), a communications port, a PCMCIA slot and card, or the like. Software and data transferred via communications interface may be in the form of signals, which may be electronic, electromagnetic, optical, or other signals capable of being received by communications interface 1060. These signals may be provided to communications interface 1060 via a communications path of device 1000, which may be implemented using, for example, wire or cable, fiber optics, a phone line, a cellular phone link, an RF link or other communications channels.

The hardware elements, operating systems, and programming languages of such equipment are conventional in nature, and it is presumed that those skilled in the art are adequately familiar therewith. A device 1000 also may include input and output ports 1050 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

The systems, apparatuses, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these the apparatuses, devices, systems, or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context.

It is intended that the specification and examples be considered as exemplary only, with a true scope and spirit of the disclosure being indicated by the following claims.

What is claimed is:

1. A computer-implemented method of hosting an electronic transactions platform executing transactions of clothing subscriptions, the method comprising:
    hosting, by one or more processors, an electronic transactions platform executing transactions of clothing subscriptions, the electronic transactions platform comprising a user interface displaying images of articles of clothing to users subscribed to the electronic transactions platform for clothing subscriptions;
    analyzing, by the one or more processors, a portion of an image depicting an article of clothing that has been selected, viewed, or previously worn by a user subscribed to the electronic transactions platform for clothing subscriptions, the analyzing including deriving one or more colors or one or more patterns of the article of clothing;
    determining, by the one or more processors, one or more recommended articles of clothing for the user subscribed to the electronic transactions platform for clothing subscriptions, based on the analyzed portion of the image;
    displaying or transmitting, by the one or more processors, information regarding the at least one or more recommended articles of clothing to a device of the user subscribed to the electronic transactions platform for clothing subscriptions; and
    processing, by the one or more processors, one or more electronic transactions to initiate shipping the one or more recommended articles of clothing to the user subscribed to the electronic transactions platform.

2. The computer-implemented method of claim 1, further comprising:
    receiving, by one or more processors, images and data describing one or more articles of clothing available for physical shipment to subscribers via electronic transactions on the electronic transactions platform for clothing subscriptions.

3. The computer-implemented method of claim 2, wherein receiving the images and data describing one or more articles of clothing available for physical shipment comprises:
    receiving the images and data describing one or more articles of clothing from one or more electronic tenant interfaces, wherein the one or more electronic tenant interfaces comprise one or more user interfaces accessible from one or more tenant devices over one or more networks.

4. The computer-implemented method of claim 2, further comprising:
    updating one or more catalogs based on the received images and data describing one or more articles of clothing available for physical shipment to subscribers of the electronic transactions platform for clothing subscriptions.

5. The computer-implemented method of claim 1, wherein the one or more electronic transactions include at least one or more of a request to initiate or process a return of one or more articles of clothing, track a physical shipment of one or more articles of clothing, and request a physical shipment of one or more articles of clothing.

6. The computer-implemented method of claim 1, wherein the electronic transactions platform for clothing subscriptions comprises one or more user platforms, the method further comprising:
    receiving the one or more electronics transactions initiated at the device of the subscriber of the electronic transactions platform for clothing subscriptions;
    receiving the one or more electronics transactions at the one or more user platforms, wherein the one or more user platforms comprise one or more user interfaces accessible from one or more subscriber devices over the one or more networks; and
    displaying the information regarding the at least one or more recommended wearable items on the one or more user interfaces.

7. The computer-implemented method of claim 6, wherein the one or more electronics transactions include a request to be shipped one or more articles of clothing in response to the information regarding the at least one or more recommended articles of clothing; and
    processing, by the one or more processors, the received one or more electronic transactions.

8. A computer system for hosting an electronic transactions platform executing transactions of clothing subscriptions, the computer system comprising:
    a data storage device storing processor-readable instructions; and
    a processor configured to execute the instructions to perform a method including:
    hosting an electronic transactions platform executing transactions of clothing subscriptions, the electronic transactions platform comprising a user interface displaying images of articles of clothing to users subscribed to the electronic transactions platform for clothing subscriptions;
    analyzing a portion of an image depicting an article of clothing that has been selected, viewed, or previously worn by a user subscribed to the electronic transactions platform for clothing subscriptions, the analyzing including deriving one or more colors or one or more patterns of the article of clothing;
    determining one or more recommended articles of clothing for the user subscribed to the electronic transactions platform for clothing subscriptions, based on the analyzed portion of the image;
    displaying or transmitting information regarding the at least one or more recommended articles of clothing to a device of the user subscribed to the electronic transactions platform for clothing subscriptions; and processing one or more electronic transactions to initiate shipping the one or more recommended articles of clothing to the user subscribed to the electronic transactions platform.

9. The computer system of claim 8, wherein the processor is further configured for:

receiving images and data describing one or more articles of clothing available for physical shipment to subscribers via electronic transactions on the electronic transactions platform for clothing subscriptions.

10. The computer system of claim 9, wherein receiving the images and data describing one or more articles of clothing available for physical shipment comprises:

receiving the images and data describing one or more articles of clothing from one or more electronic tenant interfaces, wherein the one or more electronic tenant interfaces comprise one or more user interfaces accessible from one or more tenant devices over one or more networks.

11. The computer system of claim 9, wherein the processor is further configured for:

updating one or more catalogs based on the received images and data describing one or more articles of clothing available for physical shipment to subscribers of the electronic transactions platform for clothing subscriptions.

12. The computer system of claim 8, wherein the one or more electronic transactions include at least one or more of a request to initiate or process a return of one or more articles of clothing, track a physical shipment of one or more articles of clothing, and request a physical shipment of one or more articles of clothing.

13. The computer system of claim 8, wherein the electronic transactions platform for clothing subscriptions comprises one or more user platforms, and wherein receiving the one or more electronics transactions initiated at the device of the subscriber of the electronic transactions platform for clothing subscriptions comprises:

receiving the one or more electronics transactions at the one or more user platforms, wherein the one or more user platforms comprise one or more user interfaces accessible from one or more subscriber devices over the one or more networks.

14. The computer system of claim 13, wherein the processor is further configured for:

displaying the information regarding the at least one or more recommended wearable items on the one or more user interfaces.

15. A non-transitory computer-readable medium containing instructions for dynamically managing data associated with electronic transactions of clothing in an electronic transactions platform for clothing subscriptions that, when executed by a processor, cause the processor to perform a method comprising:

hosting an electronic transactions platform executing transactions of clothing subscriptions, the electronic transactions platform comprising a user interface displaying images of articles of clothing to users subscribed to the electronic transactions platform for clothing subscriptions;

analyzing a portion of an image depicting an article of clothing that has been selected, viewed, or previously worn by a user subscribed to the electronic transactions platform for clothing subscriptions, the analyzing including deriving one or more colors or one or more patterns of the article of clothing;

determining one or more recommended articles of clothing for the user subscribed to the electronic transactions platform for clothing subscriptions, based on the analyzed portion of the image;

displaying or transmitting information regarding the at least one or more recommended articles of clothing to a device of the user subscribed to the electronic transactions platform for clothing subscriptions; and processing one or more electronic transactions to initiate shipping the one or more recommended articles of clothing to the user subscribed to the electronic transactions platform.

16. The non-transitory computer-readable medium of claim 15, the method further comprising:

receiving images and data describing one or more articles of clothing available for physical shipment to subscribers via electronic transactions on the electronic transactions platform for clothing subscriptions.

17. The non-transitory computer-readable medium of claim 16, the method further comprising:

updating one or more catalogs based on the received images and data describing one or more articles of clothing available for physical shipment to subscribers of the electronic transactions platform for clothing subscriptions.

18. The non-transitory computer-readable medium of claim 15, wherein the one or more electronic transactions include at least one or more of a request to initiate or process a return of one or more articles of clothing, track a physical shipment of one or more articles of clothing, and request a physical shipment of one or more articles of clothing.

19. The non-transitory computer-readable medium of claim 15, wherein the electronic transactions platform for clothing subscriptions comprises one or more user platforms, and wherein receiving the one or more electronics transactions initiated at the device of the subscriber of the electronic transactions platform for clothing subscriptions comprises:

receiving the one or more electronics transactions at the one or more user platforms, wherein the one or more user platforms comprise one or more user interfaces accessible from one or more subscriber devices over the one or more networks.

20. The non-transitory computer-readable medium of claim 19, the method further comprising:

displaying the information regarding the at least one or more recommended wearable items on the one or more user interfaces.

* * * * *